(12) United States Patent
Denu

(10) Patent No.: US 8,196,492 B1
(45) Date of Patent: Jun. 12, 2012

(54) VERSATILE ROBOTIC MODULE AND ROBOTS COMPRISING SAME

(76) Inventor: David Sutton Denu, Yorktown Heights, NY (US)

( * ) Notice: Subject to any disclaimer, the term of this patent is extended or adjusted under 35 U.S.C. 154(b) by 201 days.

(21) Appl. No.: 12/508,787

(22) Filed: Jul. 24, 2009

(51) Int. Cl.
*B25J 17/00* (2006.01)

(52) U.S. Cl. ............... 74/490.05; 74/490.04; 74/490.01; 414/744.5; 901/21; 901/15

(58) Field of Classification Search ............... 414/744.5, 414/449.1; 901/21, 15; 74/490.04, 490.01, 74/490.05
See application file for complete search history.

(56) References Cited

U.S. PATENT DOCUMENTS

| | | | | |
|---|---|---|---|---|
| 4,842,476 A | * | 6/1989 | Shiotani ..................... | 414/751.1 |
| 5,456,561 A | * | 10/1995 | Poduje et al. .............. | 414/744.5 |
| 6,105,454 A | * | 8/2000 | Bacchi et al. .............. | 74/490.03 |
| 6,471,504 B1 | | 10/2002 | Matsui | |
| 2003/0113197 A1 | * | 6/2003 | Hwang et al. .............. | 414/749.1 |

FOREIGN PATENT DOCUMENTS

| DE | 4003624 A1 | 10/1991 |
|---|---|---|
| JP | 10193287 A1 | 7/1998 |

\* cited by examiner

*Primary Examiner* — Donald Underwood
(74) *Attorney, Agent, or Firm* — Patent Innovations LLC; John M. Hammond

(57) ABSTRACT

A robotic module comprising a housing having opposed first and second sides, and comprising a base, a first end comprising a first drive feature on one of the first and second sides, and a second end comprising a second drive feature on one of the first and second sides. A first rotatable hub is mounted on the first end of the housing and comprises a third drive feature on the side of the housing opposite the side of the first drive feature. A second rotatable hub is mounted on the second end of the housing and comprises a fourth drive feature on the side of the housing opposite the side of the second drive feature. The robotic module is further comprised of a coupling for synchronously rotating the first and second rotatable hubs. A first robotic module may be engaged with a second robotic module to form a robot.

20 Claims, 11 Drawing Sheets

VERSATILE ROBOTIC MODULE AND ROBOTS COMPRISING SAME

BACKGROUND OF THE INVENTION

1. Field of the Invention

Robotic arms having multiple degrees of freedom of motion, and robots assembled from modular robotic arm subassemblies.

2. Description of Related Art

A variety of robotic arms and robotic systems are known in the material handling and manufacturing arts. Among the more common robots are the gantry robot, the articulated robot, the polar robot, and the Selective Compliant Articulated Robot Arm (SCARA) robot.

The gantry or Cartesian robot may be constructed of two or three linear actuators. The range of the actuators defines the rectangular working envelope for the system. Although some commercial systems are available as complete systems, most Cartesian systems are constructed of individual linear components selected according for the application. Gantry systems can be very large, as well as small enough to fit on a bench The articulated robot is a robot with rotary joints. The appearance of an articulated robot is the image that commonly comes to mind when one thinks of industrial robots. Articulated robots are most often quite large and capable of handling payloads of up to hundreds of pounds.

The polar robot typically is comprised of two linear axes and a single rotational axis. The axes are usually oriented as a linear vertical axis, a linear radial axis, and a rotational axis. As a result of this arrangement, the polar robot has a cylindrical working envelope. Polar robots are frequently used when the working area can be arranged around the center of the robot. Polar systems are also typically used in more compact systems that are required to fit on a bench workspace.

The SCARA robot is similar to the polar robot in that it comprises a linear vertical axis and rotation axis. However, the SCARA robot uses a combination of links and rotational axes to provide the radial range of motion. By combining control of each joint in the arm links, complex motion trajectories can be obtained. Very large SCARA robots have been made and used, but most are smaller bench-scale systems.

Common to all robot systems, with the exception of the Cartesian robot, is that there are limited commercial offerings of smaller units for small scale use. This can be a barrier in solving certain material handling problems that are small in scale and require high precision. For example, there may be a need to create a robotic system for transferring a glass microscope slide from a slide receptacle to a microscope instrument for analysis, and subsequently removing the glass slide from the microscope and returning it to the receptacle. The available time budget for an engineer to solve the problem may be short, requiring the maximum use of "off-the-shelf" components wherever possible. Currently, a common way to solve the problem would be to purchase some off-the-shelf motorized linear components from a supplier's catalog, and attempt construct a gantry type robot.

However, the solution to the material handling problem may often have to address additional requirements or constraints. For example, in the present microscope slide handling problem, the robot may need to reach around an obstacle in its tool path, or the robot may need to be retracted to its minimum envelope when not in use. A commercial SCARA robot or an articulated could possibly address these aspects of the problem, but they are generally too bulky and expensive to provide a satisfactory solution. Additionally, for example, there may be a present or future need to add an additional axis of motion to the robot, so that it may handle multiple glass microscope slides for increased throughput.

There is therefore an need for a robot which can be quickly assembled from simple, inexpensive modular subassemblies, or modules. There is a need for a versatile robotic module which enables a robotic design to meet the desired function, rather than having to design the robotic system around available components. A robotic system made with the robotic module needs to be capable of having additional axes added without a redesign of the overall system.

SUMMARY OF THE INVENTION

The present invention meets this need by providing a versatile robotic module comprised of a drive, motor, and articulation components in a single assembly. Externally, the assembly is comprised of two hubs disposed at opposite ends of a static housing. Internally, a motor with a drive assembly provides a force to rotate the two hubs in a synchronous manner. The hubs typically rotate with a 1:1 ratio, although other ratios are possible and may be preferred in some applications. Each hub incorporates a standardized pattern of holes or another engagement arrangement that may serve to join a first module to another similar module, or to an end-effector, or to a stationary mount. The flexibility of the versatile robotic module enables different assembly variations, in different sizes of assemblies, and with different drive ratios between the hubs.

In one embodiment, the module may be "passive" in that the two hubs rotate in unison but are not driven by a drive element. This type of module may be used when a lesser degree of freedom is acceptable in the overall robotic system assembled from one or more modules.

One aspect of the versatile robotic module is that in assembling a robot comprised of one or more modules, cost and complexity of the robot are minimized, while saving time in the assembly process. Utilizing the modular design of the versatile robotic module, unique systems can be constructed to meet requirements that may not possible with commercial offerings. Another aspect of the robotic module is that a SCARA-type robot may be quickly and inexpensively assembled with standardized components.

More specifically, in accordance with the present disclosure, a robotic module is provided comprising an elongated housing having opposed first and second sides, and comprising a base, a first end comprising a first drive feature on one of the first and second sides of the housing, and a second end comprising a second drive feature on one of the first and second sides of the housing. A first rotatable hub is mounted on the first end of the housing and comprises a third drive feature on the side of the housing opposite the side of the first drive feature. A second rotatable hub is mounted on the second end of the housing and comprises a fourth drive feature on the side of the housing opposite the side of the second drive feature. The robotic module is further comprised of means for synchronously rotating the first rotatable hub and the second rotatable hub. The module may be configured in a highly versatile manner, such that any one of the first, second, third, and fourth drive features of the first hub of the robotic module is engageable with any one of a first drive feature, a second drive feature, a third drive feature, and a fourth drive feature of a second robotic module that is similar to or a duplicate of the robotic module. In that manner, a first robotic module may be easily engaged with a second robotic module to form a robot with multiple degrees of freedom of motion.

The means for synchronously rotating the first rotatable hub and the second rotatable hub may be a mechanical coupling between them. Such means may be comprised of a drive belt operatively engaged with the first rotatable hub and the second rotatable hub and a drive carriage operatively engaged with the drive belt. A motor may be operatively connected to the drive carriage. The motor may be a rotary motor comprising a rotatable shaft. A lead screw may be operatively connected to the rotatable shaft of the rotary motor and to the drive carriage. To provide the capability to control the operation of the robotic module, the drive carriage may detectable by a first sensor mounted in the housing. A second sensor may also be provided, such that the opposing limits of travel of the drive carriage may be detected by the sensors.

Also according to the present disclosure, a robot is further provided comprised of a first robotic module and a second robotic module, each of the first and second robotic modules comprising an elongated housing, first and second rotatable hubs, means for synchronously rotating the first rotatable hub and the second rotatable hub, and drive features in the housing and the respective hubs as recited above. For each of the robotic modules, the means for synchronously rotating the respective first and second rotatable hubs may be comprised of a drive belt operatively engaged with the first rotatable hub and the second rotatable hub and a drive carriage operatively engaged with the drive belt. The first drive carriage may be operatively engaged with the drive belt of the first robotic module and a first motor may be provided that is operatively connected to the first drive carriage of the first robotic module. In like manner, the second drive carriage may be operatively engaged with the drive belt of the second robotic module and a second motor may be provided that is operatively connected to the second drive carriage of the second robotic module.

The first and second robotic modules may be configured such that any one of the first, second, third and fourth drive features of the first robotic module may be engaged with any one of the first, second, third, and fourth drive features of the second robotic module. In one embodiment, the first drive feature of the housing of the first robotic module is engaged with the third drive feature of the first rotatable hub of the second robotic module. In this embodiment, the fourth drive feature of the second hub of the second robotic module may be connected to a stationary mount. The robot may be further comprised of a tool operatively connected to the fourth drive feature of the second hub of the first robotic module. The tool may be an end effector for gripping objects or handling various materials.

BRIEF DESCRIPTION OF THE DRAWINGS

The present disclosure will be provided with reference to the following drawings, in which like numerals refer to like elements, and in which.

DESCRIPTION OF THE PREFERRED EMBODIMENTS

Figure 1:
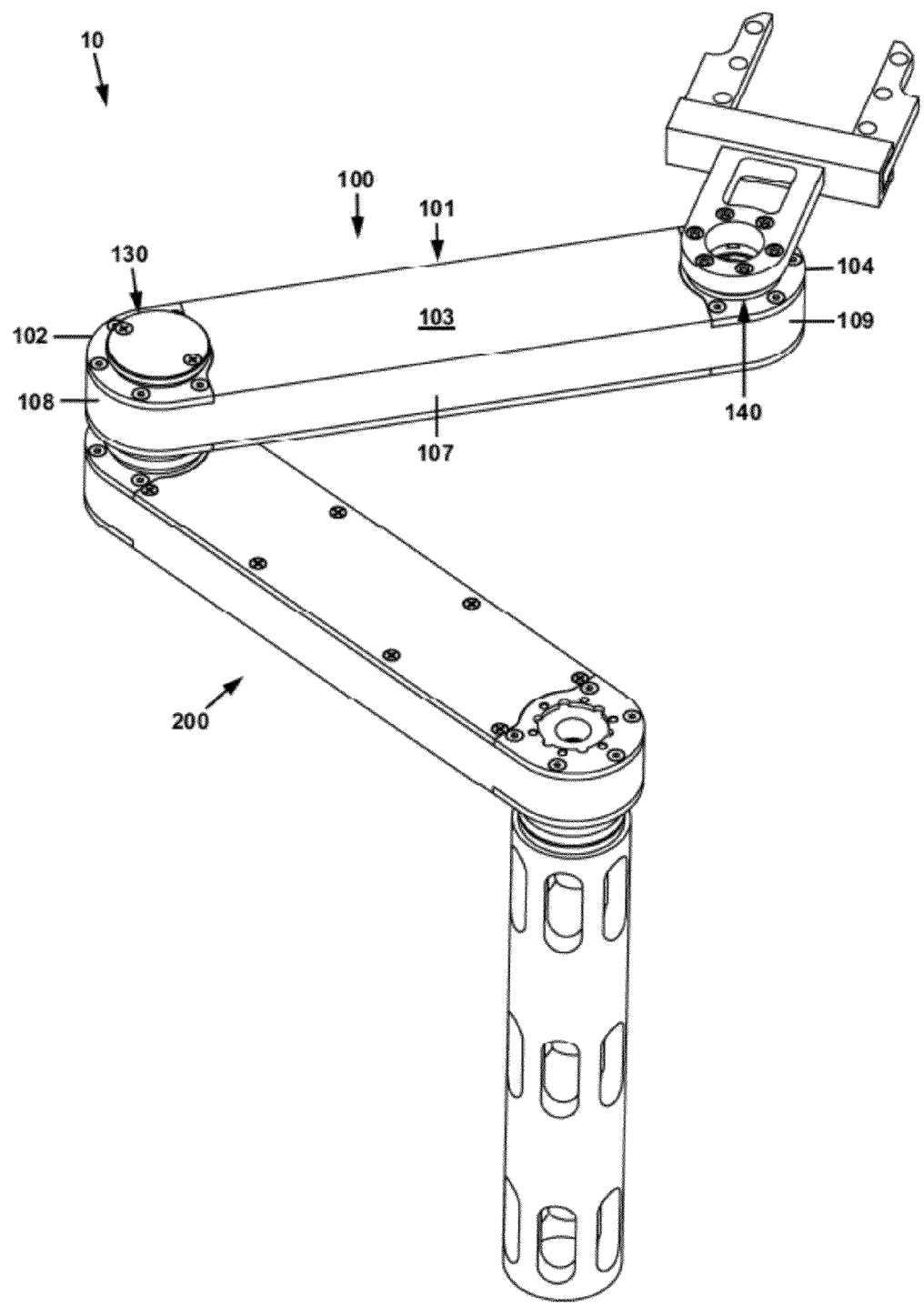
FIG. 1 is an upper perspective view of a robotic assembly comprised of two robotic modules of the present disclosure.

The present invention will be described in connection with preferred embodiments, however, it will be understood that there is no intent to limit the invention to the embodiments described. On the contrary, the intent is to cover all alternatives, modifications, and equivalents as may be included within the spirit and scope of the invention as defined by the appended claims.

For a general understanding of the present invention, reference is made to the drawings. In the drawings, like reference numerals have been used throughout to designate identical elements. In the following disclosure, the robotic module of the present invention is described in the context of its use as a modular component, multiples of which may be assembled to provide a robot. However, it is not to be construed as being limited only to use in robots. The module is adaptable to other uses in machine systems. Additionally, the description may identify certain components with the adjectives "top," "upper," "bottom," "lower," "left," "right," etc. These adjectives are provided in the context of the orientation of the drawings, which is arbitrary. The description is not to be construed as limiting the robotic module to use in a particular spatial orientation. The instant module may be used in orientations other than those shown and described herein.

In the following disclosure, a brief description of a robot comprising multiple robotic modules will be provided, which will be followed by a detailed description of the robotic module and the manner in which they may be coupled together to form a robot, which will be followed by a description of the operation of a robot comprising robotic modules.

Figure 2:
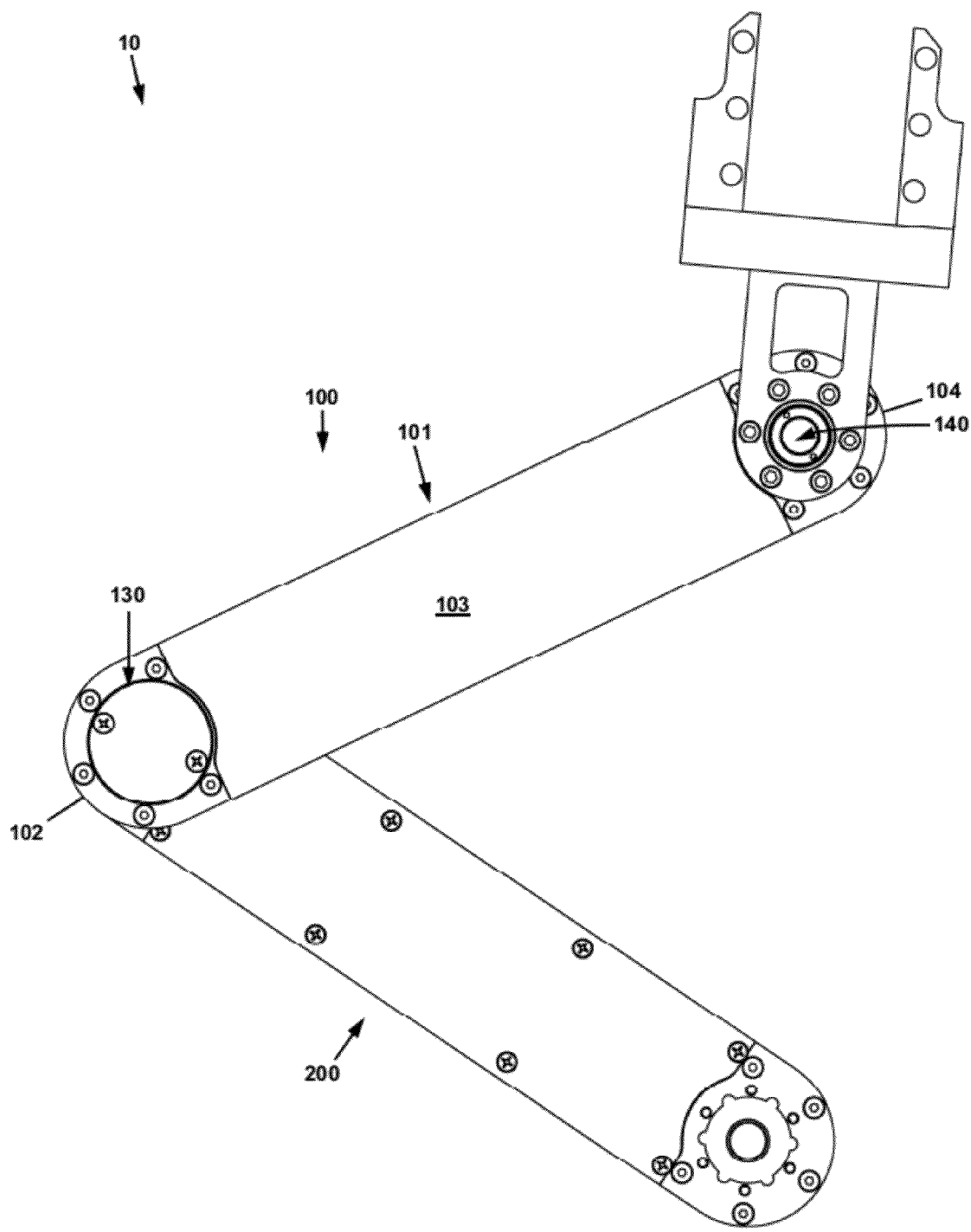
FIG. 2 is a plan view of the robotic assembly of FIG. 1.
Figure 3:
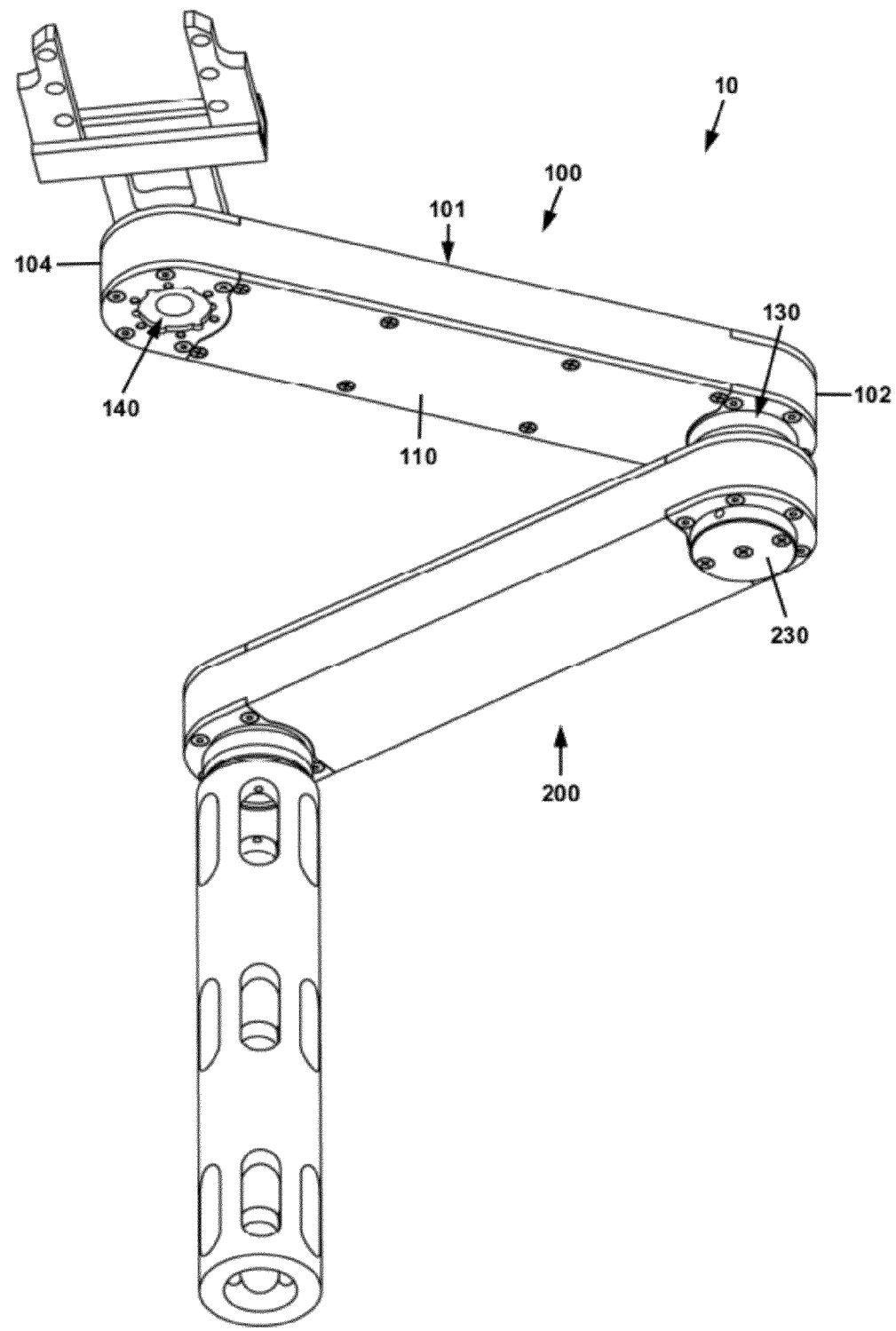
FIG. 3 is a lower perspective view of the robotic assembly of FIG. 1.

FIG. 1 is an upper perspective view of a robotic assembly, or robot, comprised of two robotic modules; FIG. 2 is a plan view of the robot of FIG. 1; and FIG. 3 is a lower perspective view of the robot of FIG. 1. The robot 10 of FIGS. 1-3 is comprised of a first robotic module 100 and a second robotic module 200 that are coupled to each other. The first and second robotic modules 100 and 200 may be substantially identical to each other. The robotic module 100 is comprised of an elongated rigid housing 101. At each of the respective ends 102 and 104 of the housing 110 are hubs 130 and 140 that rotate in a synchronized manner. The rotation may be controlled with a computer. The hubs 130 and 140 are coupled together with a positive drive element such as a belt or roller chain. As one hub rotates, the other rotates in the same direction at a pre-defined ratio of their respective diameters. The construction of the module 100 is such that at each end 102 and 104, on axis with the respective hubs 130 and 140, the hubs 130 and 140 may protrude from the housing 101 on one side thereof to provide moveable (i.e., rotating) drive surfaces or features. When the robotic module 100 is joined to another robotic module, there is provided on that module opposite to the moveable drive surfaces/features of respective hubs 130 (or 140) a matching drive surface or feature that is fixed to or formed within the housing of that module. By way of example, in one embodiment of the robot 10, the moveable drive feature of the hub 230 of robotic module 200 may be engaged with the fixed drive feature of the hub 130 of adjoining robotic module 100 to create an assembly joint of the robot 10. This and other configurations and motion capabilities of various robots 10 will be explained in greater detail subsequently herein, following a detailed description of a robotic module 100.

Figure 4:
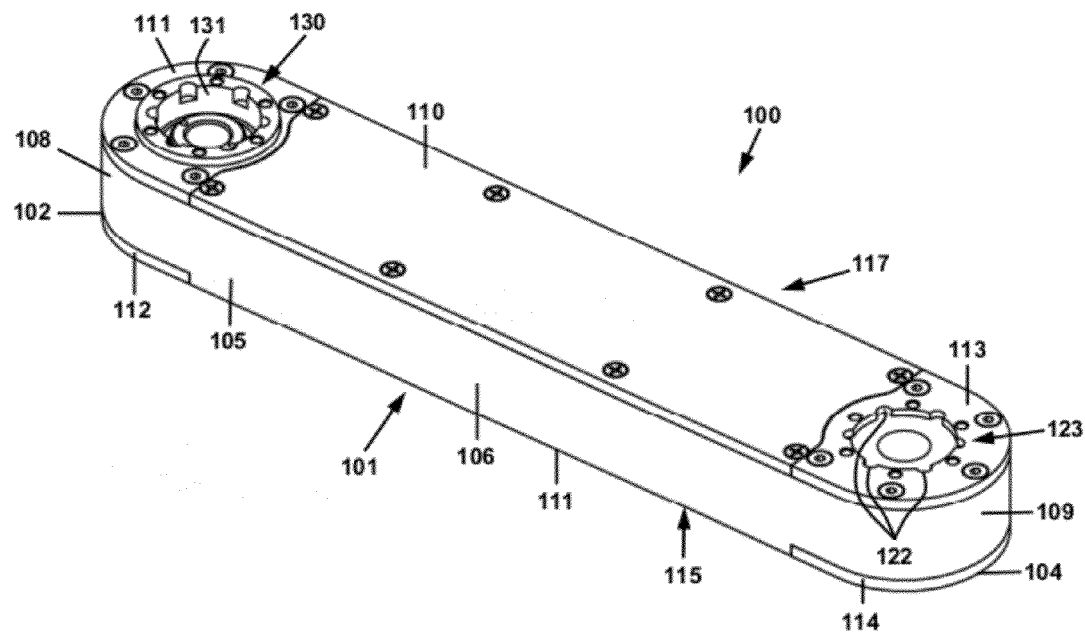
FIG. 4 is an upper perspective view of a robotic module of the present disclosure.
Figure 5:
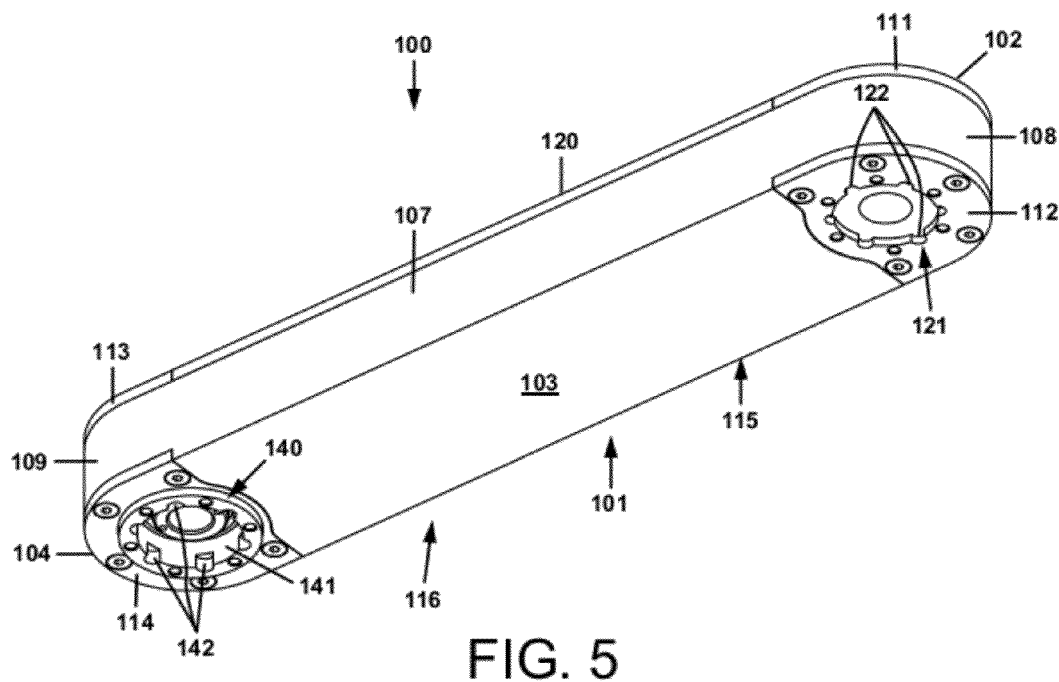
FIG. 5 is a lower perspective view of the robotic module of FIG. 4.

The structure and function of a robotic module 100 is best understood with reference to FIGS. 4-7. (It is noted that in the robot 10 of FIGS. 1-3, the robotic module 100 is inverted with respect to the orientation depicted in FIGS. 4-7.) FIGS. 4 and 5 are upper and lower perspective views, respectively, of the robotic module 100. The robotic module 100 is comprised of an elongated housing 101 comprising a base 103, a first end 102, and a second end 104. The housing may be further comprised of a side wall 105, which comprises rectangular central walls 106 and 107, and half-cylindrical end walls 108 and 109. The housing may be further comprised of a removable main cover 110, first end removable upper and lower covers 111 and 112 and second end upper and lower covers 113 and 114, all of which may secured to the main housing body 115 by suitable fasteners, such as screws.

The elongated housing 101 has opposed first and second sides 116 and 117. The first side 116 of housing 101 includes the base 103, the first end lower cover 112, and the second end lower cover 114. The second side 117 of housing 101 includes the main cover 110, the first end upper cover 111, and the second end upper cover 113. The first end 102 of the housing 101 includes a first drive feature 121 on the first side 116 of the housing 101. The second end 104 of the housing 101 includes a second drive feature 123 on the second side 117 of the housing 101. In the robotic module 100 of FIGS. 4 and 5, the drive features 121 and 123 are formed in lower end cover 112 and upper end cover 113, respectively. In one embodiment, the drive features 121 and 123 may be formed as circular openings in their respective end covers 121 and 123, and may further include a plurality of notches 122 that are formed in the circular openings. The centers of the circular openings are coaxial with the central axes of the respective rotatable hubs 130 and 140. The notches 122 of the drive features 121 and 123 are engageable with corresponding drive features of other robotic modules, or with a coupler disposed between them so that a robot (such as, e.g., robot 10 of FIGS. 1-3) can be assembled from multiple modules 100 as will be explained subsequently herein.

Referring also to FIGS. 6, 7, 8A, and 8B, a first rotatable hub 130 is mounted on the first end 102 of the housing 101 and is rotatable by use of suitable bearings 134 and 135, such as roller bearings or ball bearings. In like manner, a second rotatable hub 140 is mounted on the second end 104 of the housing 101. The first rotatable hub 130 is comprised of a third drive feature 131, which may be approximately coplanar with the second side 117 of the housing 101. In like manner, a second rotatable hub 140 is mounted on the second end 104 of the housing 101 and comprises a fourth drive feature 141 that may be approximately coplanar with the first side 116 of the housing.

In one embodiment, the drive features 131 and 141 may be formed as recessed sockets in their respective rotatable hubs 130 and 140, and may further include a plurality of notches 132 and 142, respectively, that are formed in the sockets. The drive features 131 and 141 are engageable with similar drive features of rotatable hubs of other robotic modules 100, or with the fixed drive features formed in the housings of other robotic modules 100, or with couplers disposed between the modules when such modules are combined to make a robot as will be explained subsequently herein.

The orientation of the drive features in FIGS. 4 and 5 is not limited to a configuration in which a hub drive feature such as drive feature 131 is on the same side 117 of the module 100 as a housing drive feature 123. The robotic module 100 may be provided with two hub drive features on one side of the module 100, and two housing drive features on the other side of the module. This is enabled by the fact that the hub and end cover subassemblies are reversible with respect to the housing 101. This is best understood with reference to FIGS. 8A and 8B. A hub and end cover subassembly 120 is comprised of the lower end cover 112, the upper end cover 111, and the rotating hub 130. (For the sake of clarity of illustration, the main cover body 115 between the lower and upper end covers 112 and 111 is not shown.) The lower end cover is further comprised of an upward annular extension comprising lower and upper bearing races 118 and 119, upon which bearings 134 and 135 are disposed. The rotating hub 130 is carried by bearings 134 and 135, thereby providing its rotational capability. The lower and upper covers 111 and 112 are joined to the main cover body 115 by suitable fasteners as shown in FIGS. 4 and 5. It can be seen that the entire hub and end cover subassembly 120 can be easily inverted from the orientation shown in FIGS. 4 and 5, such that the hub drive features are on one side of the module 100, and the housing drive features are on the other side of the module 100. In that manner, there is greater versatility in assembling robots from multiple modules 100.

The robotic module 100 is further comprised of means for synchronously rotating the first rotatable hub 130 and the second rotatable hub 140. Such means may be provided by forming a mechanical coupling between the first rotatable hub 130 and the second rotatable hub 140. In the embodiment depicted in FIGS. 6 and 7, the drive means 160 is comprised of a drive belt 162 that is operatively engaged with the first rotatable hub 130 and the second rotatable hub 140. The drive belt 162 may be a flexible toothed belt that is comprised of a rubber or other elastomer that may be reinforced with various types of fibers. In operation, the teeth of the belt engage with corresponding teeth 133 and 143 that are provided in respective rotatable hubs 130 and 140. Such a configuration provides a smooth, slip-free operation of the belt 162 on the hubs 130 and 140. However, the belt and hubs are not limited to such a configuration. As used herein, the term "belt" is to include other types of belts, such as v-belts, knob belts, as well as various chains, with the hubs including corresponding sheaves, knob sockets, or sprockets to match and engage with the belts.

Figure 6:
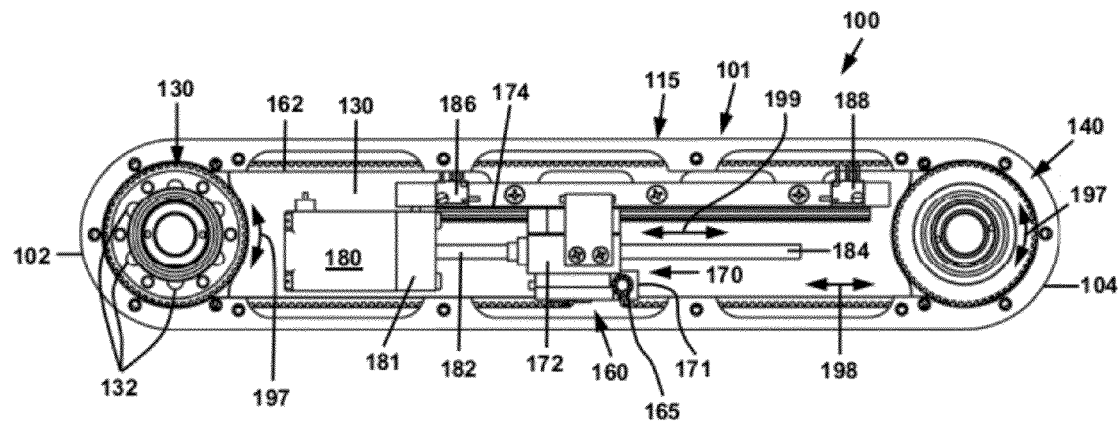
FIG. 6 is a plan view of the robotic module of FIG. 4, shown with the covers of the housing removed so as to depict the internal components thereof.
Figure 7:
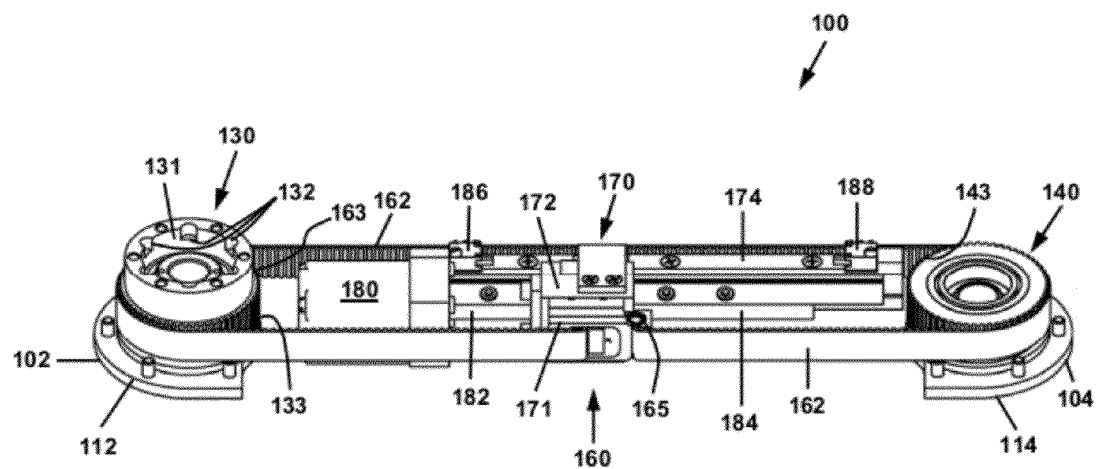
FIG. 7 is a side perspective view of the robotic module of FIG. 4, shown with the covers and base of the housing removed.

The drive means 160 may further include a drive carriage 170 that is operatively engaged with the drive belt 162. The drive carriage 170 serves to provide an attachment to the belt 162, which can be mechanically driven linearly. By driving a section of the belt 162 that is between the rotatable hubs 130 and 140 linearly, the rotatable hubs 130 and 140 can be rotated synchronously. Referring to FIGS. 6 and 7, and also to FIG. 9, and in one embodiment depicted therein, the belt 162 may be provided with a pair of looped ends 164 and 165. To form the looped ends 164 and 165 into uniformly round shapes, pins 166 and 167 may be disposed within the respective looped ends 164 and 165. A bracket 171 is provided having sockets within which are disposed the looped ends 164 and 165 of the belt 162. The drive carriage 170 is further comprised of a drive block 172, which is joined to the drive bracket 171. The drive block 172 and drive bracket 171 are drivable linearly to provide the linear motion of a section of drive belt 162, which is converted to synchronous rotation of hubs 130 and 140 by the engagement of the belt 162 therewith.

It will be apparent that the method of engagement of the drive block 172 with the drive belt 162 is not limited to the embodiment described herein and shown in FIGS. 6-8B. In another embodiment (not shown), the drive belt may be a continuous loop of belt instead of having looped ends. The drive block 172 may be comprised of a toothed surface to match the teeth of the belt, and a clamping plate which secures a small section of the toothed belt to the toothed surface of the drive block 172. Other arrangements are contemplated depending upon the configuration of the belt, and will be apparent to those skilled in the art.

A linear actuator may be operatively connected to the drive carriage 170 to provide its linear motion. The linear actuator may be pneumatic, hydraulic, mechanical, or electromechanical. In one embodiment, the linear actuator is comprised of an electric motor. The electric motor may be a linear motor, such as a linear stepper motor, or a rotary motor such as a rotary stepper motor, a piezo motor, or a common rotary motor with a rotating armature and brushes. In the embodiment depicted in FIGS. 6 and 7, the motor is a rotary motor 180 comprising a rotatable shaft 182. The motor 180 may be mounted on a block 181, which in turn is joined to the base 130 of the housing 101. The rotatable shaft 182 may be operatively connected to a lead screw 184 (i.e., a threaded shaft), or the lead screw 184 may be integrally formed as part of the rotatable shaft 182. The lead screw 184 (threads not shown) passes through and is engaged with a correspondingly threaded passageway within the drive block 172 of the drive carriage 170. In that manner, when the motor 180 is rotated in the two rotational directions, linear motion of the drive carriage 170 and the section of belt 162 to which it is joined occurs as indicated by bidirectional arrows 199 and 198, resulting in rotational motion of hubs 130 and 140 as indicated by arcuate arrows 197. In order to provide smooth, precise operation of the drive carriage 170 and the rotatable hubs 130 and 140, the drive block 172 of the drive carriage 170 may include a linear bearing (not shown) that is engaged with a slide rail 174, which is joined to the base 130 of the housing 101.

To provide the capability to control the operation of the robotic module 100, the drive carriage 170 may detectable by at least one sensor mounted in the housing 101. In the embodiment depicted in FIGS. 6 and 7, a first sensor 186 and a second sensor 188 are provided. These sensors may be at substantially the respective limits of travel of the drive carriage 170, and may be used to prevent over travel of the drive carriage 170 and/or to reverse the direction of the drive carriage 170. The robotic module may further include an encoder (not shown) that can detect the position of the drive carriage 170 between its limits of travel. By sensing the position of the drive carriage 170, the relative rotational positions of the hubs 130 and 140 can be monitored and controlled, and the overall positions and velocities of modules of a robot can also be monitored and controlled by software.

One aspect of the translation of rotary (motor) motion to linear (leadscrew) motion, and back to rotary (belt→pulley) motion is that it provides a high mechanical advantage for the motor. In that manner, precision positioning of the module 100 as part of a robot, and precise positioning of an overall robot comprising multiple modules 100 is possible. In most practical configurations of the instant module 100, the high mechanical advantage and the inherent properties of the leadscrew 184 enable the module position to be rigid in the de-energized state, i.e., when power to the motor 170 is off. Another aspect of the module 100 is that the linear axis of operation of the drive carriage 170 provides a simple means to integrate travel limits and position encoding as described herein.

As noted previously, a first robotic module of the present disclosure may be joined to a second robotic module that is identical or similar to the first module. Either or both of the modules may be comprised of first and second rotatable hubs that are of the same diameter, such that they rotate in a 1:1 ratio, or they may be of different diameters, such that they rotate at different rates. The first drive feature of the first hub of the first robotic module is engageable with one of a first drive feature, a second drive feature, a third drive feature, and a fourth drive feature of the second robotic module. In that manner, a first robotic module may be easily engaged with a second robotic module to form a robot with multiple degrees of freedom of motion.

Figure 8A:
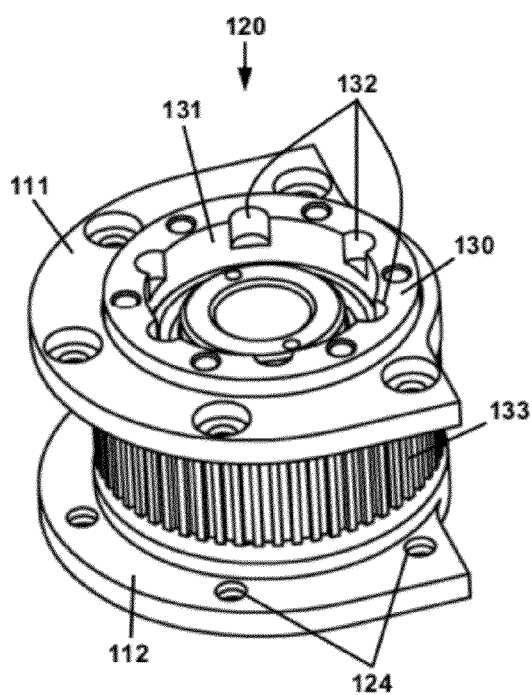
FIG. 8A is a perspective view of a subassembly of the robotic module comprising upper and lower end covers and a rotating hub.
Figure 8B:
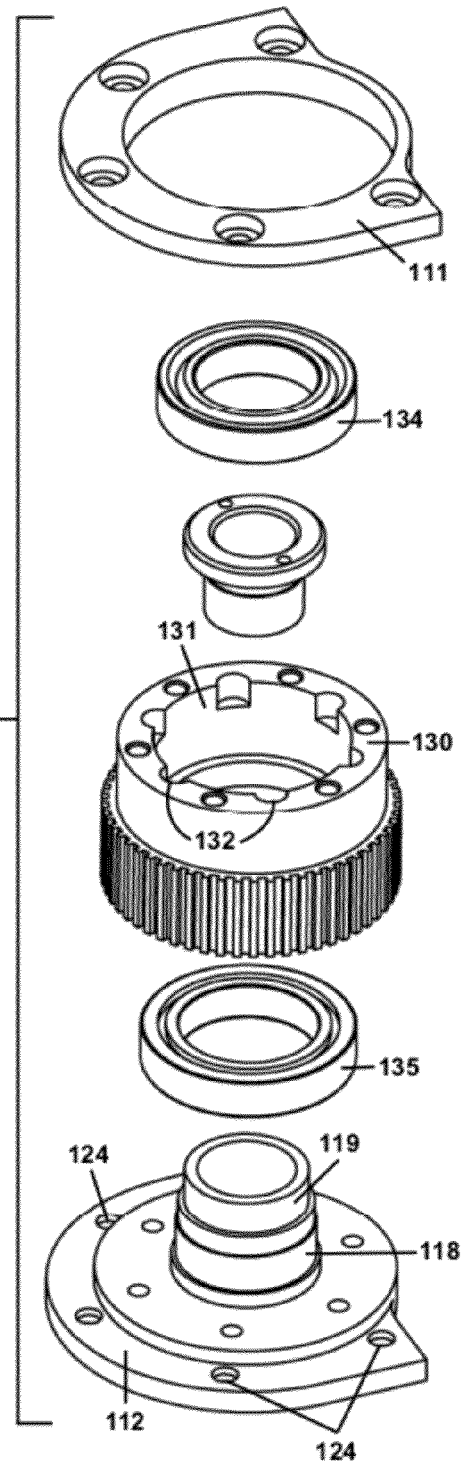
FIG. 8B is an exploded perspective view of the subassembly of FIG. 8A.
Figure 9:
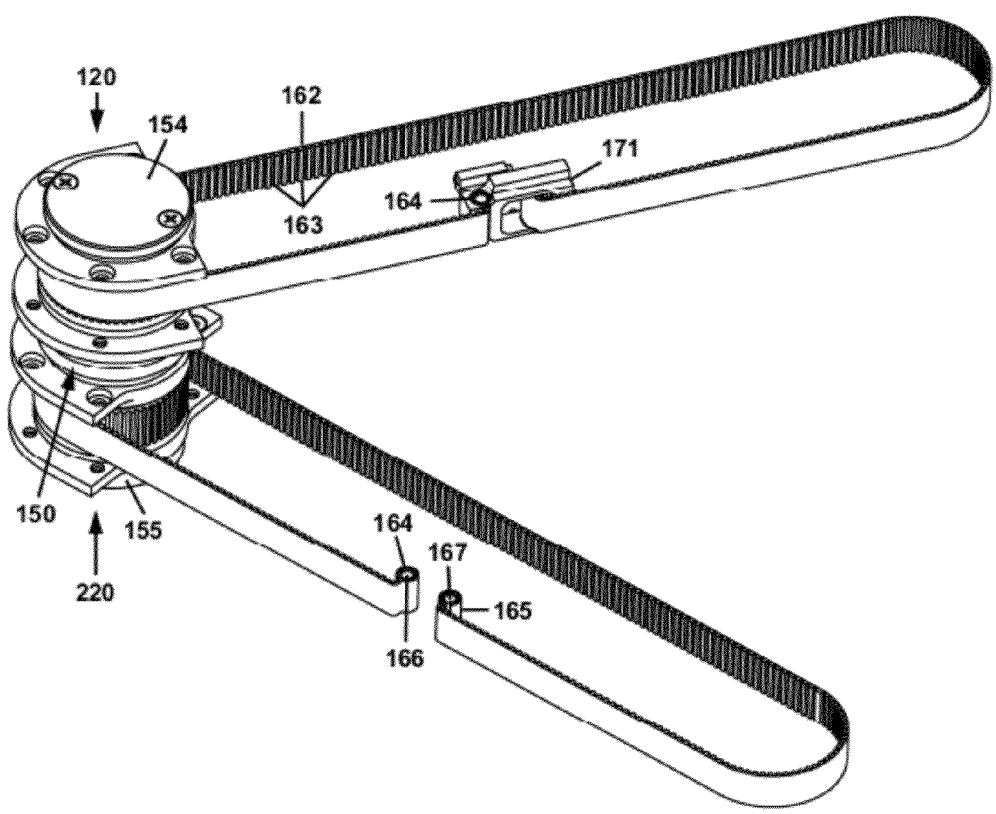
FIG. 9 is a perspective view of a drive coupling between two robotic modules that are coupled to each other.
Figure 10:
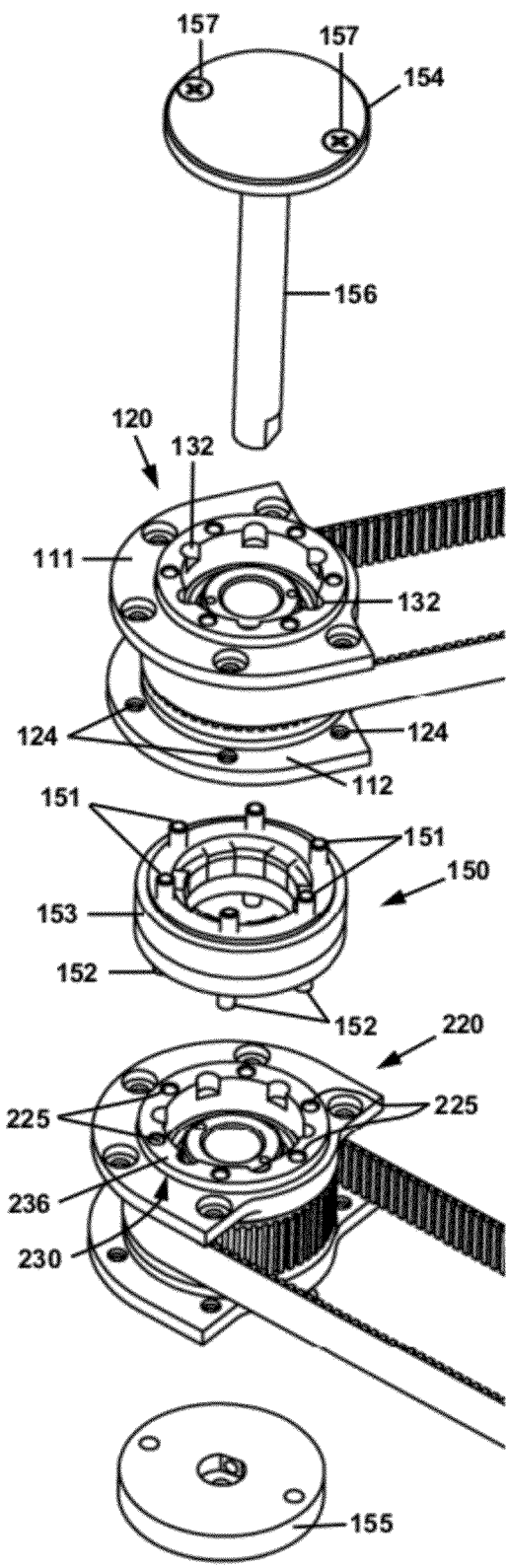
FIG. 10 is an exploded perspective view of the drive coupling of FIG. 9.

In one embodiment (not shown), a rotating hub drive feature may be configured to mate directly to another rotating hub drive feature or to a housing drive feature in a male-female relationship. In another embodiment, the drive features of the respective robotic modules may be coupled with each other by a coupling. FIG. 9 is a perspective view of an exemplary drive coupling between two robotic modules that are coupled to each other; and FIG. 10 is an exploded perspective view of the drive coupling of FIG. 9. The coupling 150 is disposed between the hub and end cover subassemblies 120 and 220 of first and second robotic modules. The coupling 150 may be comprised of a ring 153 from which protrude a plurality of upper pegs 151 and lower pegs 152. Referring also to FIGS. 1, 5 and 8B, when the two robotic modules 100 and 200 (FIG. 1) are assembled together, the upper pegs 151 are received in corresponding holes 124 in the lower cover 112, and the lower pegs 152 are received in corresponding holes 225 in the top surface 236 of the rotating hub 230 of module 200. The two modules 100 and 200 and the coupling 150 are joined together in a stacked arrangement by upper and lower plates 154 and 155, which are joined to each other by central rod 156.

Figure 11:
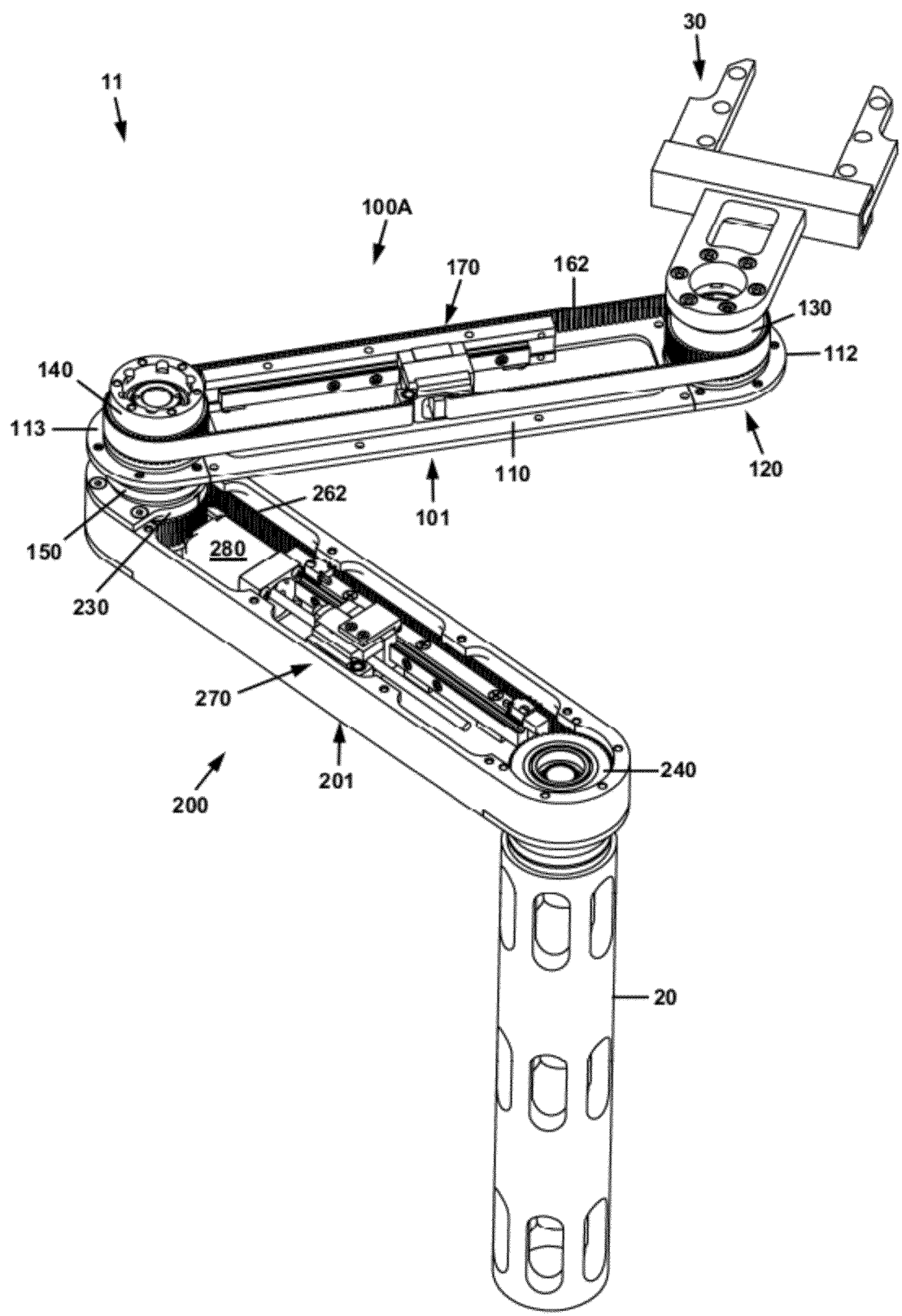
FIG. 11 is an upper perspective view of view of a first robotic assembly comprised of two robotic modules of the present disclosure, the modules shown with covers removed.
Figure 12:
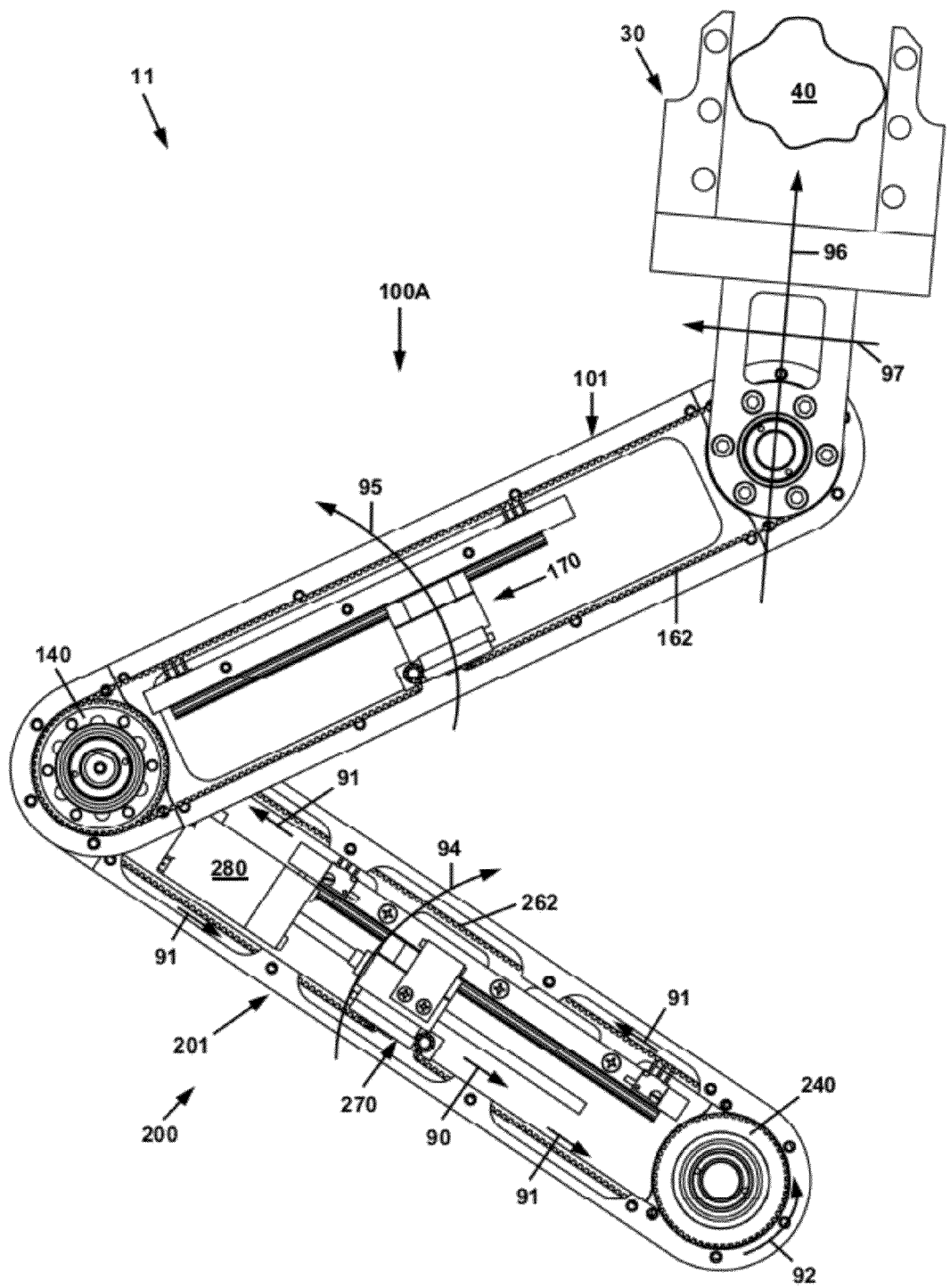
FIG. 12 is a plan view of the robotic assembly of FIG. 11.

FIG. 11 is an upper perspective view of view of a first robotic assembly comprised of two robotic modules of the present disclosure, and FIG. 12 is a plan view of the robotic assembly of FIG. 11. For the sake of clarity of illustration, the main body 115 and end covers 111 and 114 have been removed from the housing of robotic module 100A, and the main cover and one end cover have been removed from the housing 201 of robotic module 200 in FIGS. 11 and 12. The robot 11 is comprised of a first robotic module 100A and a second robotic module 200. The first and second robotic modules 100A and 200 are similar to the robotic module 100 of FIGS. 4-8B, with each comprising an elongated housing, first and second rotatable hubs, means for synchronously rotating the first rotatable hub and the second rotatable hub, and drive features in the housing and the respective hubs as described previously. In the robotic modules 100A and 200, the means for synchronously rotating the respective first and second rotatable hubs is comprised of drive belts 162 and 262 operatively engaged with the respective first rotatable hubs and the second rotatable hubs. The first and second drive carriages 170 and 270 are operatively engaged with the respective drive belts 162 and 262 of the first and second robotic modules 100A and 200. In the robot 11 of FIGS. 11 and 12, a motor 280 is provided that is operatively connected to the drive carriage 270 of the second robotic module 200. It is noted that the first robotic module 100A differs from the robotic module 100 of FIGS. 4-8B in that it is not provided with a drive motor, and the hub and end cover subassembly 120 has been inverted from the orientation of the module 100, such that the hub drive features of hubs 130 and 140 of the module 100A are on the same side thereof (the bottom side in FIG. 11) and the housing drive features are also on the same side thereof (the top side in FIG. 11).

The first and second robotic modules 100A and 200 are joined to each other by coupling 150 as described previously herein with reference to FIGS. 9 and 10. It is noted that the first and second robotic modules 100A and 200 may be configured such that any one of the first, second, third and fourth drive features of the first robotic module may be engaged with any one of the first, second, third, and fourth drive features of the second robotic module. In the robot 11 of FIG. 11, a drive feature of the housing 101 of the first robotic module 100A is engaged with a drive feature of a rotatable hub 230 of the second robotic module 200. Additionally, a drive feature of the second hub 240 of the second robotic module 200 is connected to a stationary mount 20. The stationary mount 20 may be hollow, and thus may be placed over a mounting post (not shown) that extends from a bench (not shown) or other support structure. The robot 11 may be further comprised of a tool operatively connected to the drive feature of the hub 130 of the first robotic module 100A. The tool may be an end effector 30 for gripping objects or handling various materials.

FIG. 12 depicts some relative motions that are possible with the robot 11. The motion will be described with respect to motor being operated in a particular direction, with it being understood that if motor 280 is reversed, the corresponding reverse motion of robot 11 will occur. Referring also to FIG. 11, motor 280 is operated to move drive carriage 270 as indicated by arrow 90. This motion results in the motion of belt 262 relative to housing 201 as indicated by arrows 91 and arcuate arrow 92. If rotating hub 240 were unconstrained, it would rotate by this belt motion. However, rotating hub 240 is joined to stationary mount 20. Therefore, the entire housing 201 of module 200 rotates as indicated by arcuate arrow 94. Simultaneously, the rotating hub 230 of the module 200 rotates due to the relative motion of belt 262. The drive feature of rotating hub 230 is coupled to the drive feature of housing 101 of module 100 through coupling 150. This results in the rotational motion of module 100A relative to module 200 as indicated by arcuate arrow 95. The net result is that the robot 11 "unfolds," and moves end effector 30. It is noted that so long as the drive carriage 170 of module 100 remains in a fixed position relative to housing 101, then end effector 30 does not rotate as it moves. Referring also to FIG. 10, the upper plate 154 may be provided with a pair of screws 157, which are screwed into the upper plate 154. The lower ends of the screws may be sufficiently long so as to extend downwardly past the lower surface of the plate 154, and engage with a corresponding pair of notches 132 in the rotating hub 130. In that manner, the rotating hub 130 is locked and rotates with the overall rotational motion of the module 100. Other means for locking the hub 130 and the drive carriage 170 in a fixed position may be provided.

Thus instead of rotating relative to the housing 101 of the module 100, the end effector 30 remains oriented in a constant direction while it translates along vectors 96 and 97 due to the rotational motion of modules 100A and 200. This is facilitated by the secondary coupling of hub 140 and the housing 201 with flange 155, shaft 156 and flange 154. This capability is useful when an object 40 held by end effector 30 must be maintained in a constant directional orientation while being moved.

Figure 13:
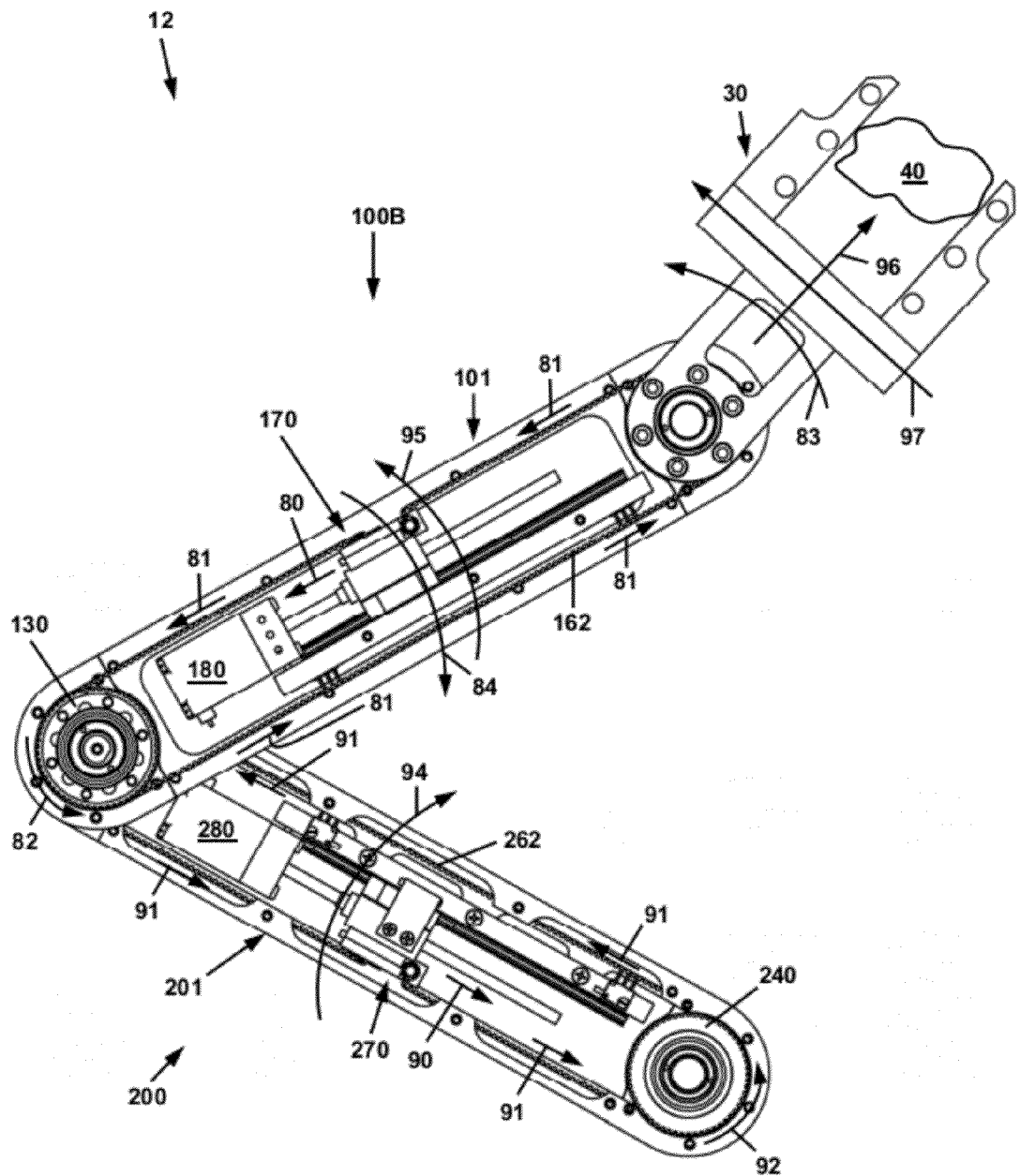
FIG. 13 is a plan view of view of a second robotic assembly comprised of two robotic modules, the modules shown with covers removed.

FIG. 13 is a plan view of view of a second robotic assembly 12 comprised of two robotic modules 100B and 200, the modules shown with covers and/or other housing components removed. The robotic assembly or robot 12 is similar to the robot 11 of FIGS. 11-12, but the robotic module 100B is further comprised of a motor 180 for moving the drive carriage 170 and belt 162 relative to the housing 101. Additionally, the robot 12 does not contain the additional joint coupling components 154, 157, 156, and 155 of FIGS. 9 and 10 that lock the rotating hub 130 with respect to the housing 101 of the module 100B. The motion of robot 12 is substantially the same as described for robot 11 of FIG. 12 as indicated by arrows 90-97, provided that the motor 180 of the module 100B is not operated. However, the motor 180 provides the additional degree of freedom to rotate the end effector 30 relative to the housing 101 of module 100B. For example, if motor 180 is operated to move drive carriage 172 as indicated by arrow 80, belt 162 moves relative to housing 101 as indicated by arrows 81. The rotating hub upon which the end effector 30 is mounted also rotates, resulting in rotational motion of the end effector 30 relative to housing 101 as indicated by arcuate arrow 83.

In another embodiment, the module 100B could be joined to the module 200 such that the rotating hub 230 of module 200 is coupled to the rotating hub 130 of module 100B. In the operation of such a robot, although the housing 101 of module 100B would be in rotational motion relative to housing 201 of module 200 as indicated by arcuate arrow 95, there would be a cancelling effect of this rotational motion as indicated by arcuate arrow 84, due to the operation of motor 180, and the relative motion of belt 162. If the motors 180 and 280 were operated at the same speed in the directions indicated, and if the drive ratios of the respective pairs of rotating hubs were 1:1, then module 100B would not rotate with respect to module 200, even though the entire robot 12 would be rotating with respect to fixed mount 20 and the end effector 30 would be rotating with respect to module 100B.

It will be apparent that by having a motor 180 in robotic module 100B, the robot 12, in its various configurations, has considerably greater degrees of freedom than robot 11 in executing a path of motion while rotating end effector 30.

Other robots formed from combinations of the robotic modules disclosed herein are contemplated. These robots may be comprised of more than two modules, and the modules may be combined in a serial manner, or in a parallel manner. For example, a three-module robot may be constructed of modules in series, i.e., a first module is coupled to a second module, which is coupled to a third module. Alternatively, a three-module robot may be constructed of modules in parallel, i.e., a first module may be coupled to a second module, and to a third module, in a substantially "Y-shaped" configuration. In such a configuration, one hub of each of the respective modules would share a common axis of rotation. The modules would be in a stacked arrangement, joined by couplings between them as described previously herein. The respective couplings between the modules could be housing-to-hub, hub-to-hub or housing-to-housing. More complex trajectories of motion would be possible with such robots. Additionally, at least two of the modules of a robot comprising three or more modules could be coupled to more complex end effectors. One end effector could pass an object to another end effector, or one end effector could hold an object, while another end effector performed an operation on the object. The instant robotic module provides great versatility in quickly assembling robots with complex and highly useful capabilities.

It is, therefore, apparent that there has been provided, in accordance with the present invention, a versatile robotic module, and a robot comprising multiple such robotic modules. Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

I claim:

1. A first robotic module comprising:
   a. an elongated housing having opposed first and second sides, and comprising a base, a first end comprising a first drive feature on one of the first and second sides of the housing, and a second end comprising a second drive feature on one of the first and second sides of the housing;
   b. a first rotatable hub mounted on the first end of the housing and comprising a third drive feature on the side of the housing opposite the side of the first drive feature;
   c. a second rotatable hub mounted on the second end of the housing and comprising a fourth drive feature on the side of the housing opposite the side of the second drive feature; and
   d. a drive belt operatively engaged with the first rotatable hub and the second rotatable hub;
   wherein any one of the first drive feature, second drive feature, third drive feature, and fourth drive features of the first robotic module is engageable with any one of a first drive feature, a second drive feature, a third drive feature, and a fourth drive feature of a second robotic module that is substantially a duplicate of the first robotic module.

2. The robotic module of claim 1, further comprising a drive carriage operatively engaged with the drive belt.

3. The robotic module of claim 2, further comprising a motor operatively connected to the drive carriage.

4. The robotic module of claim 3, wherein the motor is a rotary motor comprising a rotatable shaft.

5. The robotic module of claim 1, further comprising a drive carriage operatively engaged with the drive belt, a rotary motor comprising a rotatable shaft, and a lead screw operatively connected to the rotatable shaft of the rotary motor and to the drive carriage.

6. The robotic module of claim 2, wherein the drive carriage is detectable by a first sensor mounted in the housing.

7. A first robotic module comprising:
   a. an elongated housing having opposed first and second sides, and comprising a base, a first end comprising a first drive feature on one of the first and second sides of the housing, and a second end comprising a second drive feature on one of the first and second sides of the housing;
   b. a first rotatable hub mounted on the first end of the housing and comprising a third drive feature on the side of the housing opposite the side of the first drive feature;
   c. a second rotatable hub mounted on the second end of the housing and comprising a fourth drive feature on the side of the housing opposite the side of the second drive feature; and
   d. means for synchronously rotating the first rotatable hub and the second rotatable hub;
   wherein any one of the first drive feature, second drive feature, third drive feature, and fourth drive features of the first robotic module is engageable with any one of a first drive feature, a second drive feature, a third drive feature, and a fourth drive feature of a second robotic module that is substantially a duplicate of the first robotic module.

8. The robotic module of claim 7, wherein the means for synchronously rotating the first rotatable hub and the second rotatable hub is comprised of a drive belt operatively engaged with the first rotatable hub and the second rotatable hub.

9. The robotic module of claim 8, wherein the means for synchronously rotating the first rotatable hub and the second rotatable hub is comprised of a drive carriage operatively engaged with the drive belt.

10. The robotic module of claim 9, wherein the means for synchronously rotating the first rotatable hub and the second rotatable hub is comprised of a motor operatively connected to the drive carriage.

11. The robotic module of claim 7, wherein the means for synchronously rotating the first rotatable hub and the second rotatable hub is comprised of a drive belt operatively engaged with the first rotatable hub and the second rotatable hub, a drive carriage operatively engaged with the drive belt, a rotary motor comprising a rotatable shaft, and a lead screw operatively connected to the rotatable shaft of the rotary motor and to the drive carriage.

12. A robot comprised of a first robotic module and a second robotic module, each of the first and second robotic modules comprising:
   a. an elongated housing having opposed first and second sides, and comprising a base, a first end comprising a first drive feature on one of the first and second sides of the housing, and a second end comprising a second drive feature on one of the first and second sides of the housing;
   b. a first rotatable hub mounted on the first end of the housing and comprising a third drive feature on the side of the housing opposite the side of the first drive feature;
   c. a second rotatable hub mounted on the second end of the housing and comprising a fourth drive feature on the side of the housing opposite the side of the second drive feature; and
   d. a drive belt operatively engaged with the first rotatable hub and the second rotatable hub;
   wherein one of the first drive feature, second drive feature, third drive feature, and fourth drive features of the first rotatable hub of the first robotic module is engaged with one of the first drive feature, the second drive feature, the third drive feature, and the fourth drive features of the second robotic module; and wherein the robot may be reconfigured such that any one of the first drive feature, second drive feature, third drive feature, and fourth drive feature of the first rotatable hub of the first robotic module is engaged with any one of the first drive feature, the second drive feature, the third drive feature, and the fourth drive feature of the second robotic module.

13. The robot of claim 12, further comprising a first drive carriage operatively engaged with the drive belt of the first robotic module and a first motor operatively connected to the first drive carriage.

14. The robot of claim 13, further comprising a second drive carriage operatively engaged with the drive belt of the second robotic module and a second motor operatively connected to the second drive carriage.

15. The robot of claim 14, further comprising a tool operatively connected to one the drive features of the first robotic module not connected to the second robotic module.

16. The robot of claim 15, wherein the tool is an end effector.

17. The robot of claim 12, wherein one of the first and second drive features of the first robotic module is engaged with one of the third and fourth drive features of the second robotic module.

18. The robot of claim 17, wherein the one of the third and fourth drive features of the second robotic module not connected to the first robotic module is connected to a stationary mount.

19. The robot of claim 12, further comprising a tool operatively connected to one of the third and fourth drive feature of the second hub of the first robotic module.

20. The robot of claim 12, wherein one of the first and second rotatable hubs of the first module is coupled to one of the first and second rotatable hubs of the second module.

* * * * *